United States Patent [19]

Yusa et al.

[11] 4,287,312

[45] Sep. 1, 1981

[54] PROCESS FOR PRODUCING A GRAFT-COPOLYMER AND BLENDS THEREWITH

[75] Inventors: Haruhiko Yusa; Masanori Oota; Katumi Suzuki, all of Iwaki, Japan

[73] Assignee: Kureha Kagaku Kogyo Kabushiki Kaisha, Japan

[21] Appl. No.: 28,798

[22] Filed: Apr. 10, 1979

[30] Foreign Application Priority Data

Apr. 13, 1978 [JP] Japan ................................. 53/43694

[51] Int. Cl.$^3$ ............................................. C08L 51/04
[52] U.S. Cl. ..................................... 525/83; 525/86; 525/261; 525/262
[58] Field of Search .................... 525/83, 86, 262, 261

[56] References Cited

U.S. PATENT DOCUMENTS

| 3,886,232 | 5/1975 | Tanaka et al. | 525/83 |
| 3,899,547 | 8/1975 | Amagi et al. | 525/83 |
| 3,956,424 | 5/1976 | Murayama et al. | 525/83 |
| 4,078,018 | 3/1978 | Chauvel et al. | 525/83 |
| 4,173,598 | 11/1979 | Castelazo et al. | 525/83 |

*Primary Examiner*—Carman J. Seccuro
*Attorney, Agent, or Firm*—Wenderoth, Lind & Ponack

[57] ABSTRACT

A process for producing a graft-polymer comprises adding an aqueous solution of a salt of a strong acid and a monovalent strong base, which solution has been adjusted to a pH value of 8 to 13, to a rubber latex containing diene rubber particles and a fatty acid soap as an emulsifying agent to coagulate the above mentioned rubber particles, and thereafter adding a vinyl monomer to the latex containing the coagulated rubber particles to graft-polymerize the vinyl monomer.

According to this process, the formation of rubber masses and macroparticles during the coagulation is reduced and a rubber latex containing rubber particles having a narrow range of particle size distribution is obtained. When a graft-copolymer obtained by using the latex is blended with thermoplastic resins such as vinyl chloride resins, the impact resistance of the thermoplastic resins can be remarkably improved without impairing their transparency and gloss.

9 Claims, No Drawings

PROCESS FOR PRODUCING A GRAFT-COPOLYMER AND BLENDS THEREWITH

BACKGROUND OF THE INVENTION

The present invention relates to a process for producing a graft-copolymer for blending which is capable of imparting a high impact resistance to a thermoplastic resin having a relatively low impact resistance without impairing its transparency and luster or gloss when it is blended with the thermoplastic resin. Further, the present invention aims at producing a coagulated rubber latex of diene type which has a high degree of coagulation and a relatively narrow range of particle size distribution as a base material for a graft-copolymer advantageously on an industrial scale without the formation of rubber masses or lumps and macroparticles.

Heretofore, a latex containing coagulated and enlarged rubber particles which are formed by adding an electrolyte as a coagulating agent to a diene type rubber latex has been used as a base material for a graft-copolymer. That is, a rubber polymer constituting the rubber particles is used as a trunk polymer of a graft-copolymer.

For example, in the case where a monomer selected from styrene, acrylonitrile, methyl methacrylate and the like is added to a latex of a conjugated diene rubber of a butadiene polymer or butadiene-styrene copolymer which has been obtained through polymerization with the use of a fatty acid soap and is subjected to graft-polymerization, thereby producing an impact resistance improving agent for a thermoplastic resin such as a graft-copolymer of an acrylonitrile-butadiene-styrene resin (hereinafter referred to as ABS resin, for brevity) or a methyl methacrylate-butadiene-styrene resin (hereinafter referred to as MBS resin, for brevity), there has been known a process wherein an acid is previously added to a rubber latex to reduce the pH thereof and to coagulate and enlarge the rubber particles thereby to provide a relatively large particle size, and thereafter, the resultant rubber latex is subjected to graft-polymerization to produce a resin having a high impact resistance. There has been known also a process wherein a salt is added to rubber latex to coagulate and enlarge the rubber particles, and the resultant latex is then graft-polymerized to obtain a resin having improved impact resistance. These processes are disclosed in Japanese Patent Publication Nos. 3112/1967, 22541/1967 and 3015/1968. The resultant graft-copolymers are used as impact resistance improving agents, for example, for vinyl chloride resins, styrene-methyl methacrylate copolymers, and styrene-acrylonitrile copolymers.

However, when the above mentioned processes for coagulating and enlarging rubber particles were used, it was difficult to produce easily on an industrial scale a latex containing rubber particles of a high degree of coagulation and a relatively narrow range of particle size distribution. That is, the process in which an acid is added to coagulate the rubber particles in a rubber latex is disadvantageous in that when a quantity of the acid required to amply coagulate the rubber particles is added, the latex, in general, becomes acidic, and the dispersion stability of the latex is reduced. When the concentration of the latex is high, there is a tendency for macroparticles and rubber masses or lumps to develop.

On the other hand, the process wherein a salt is added requires a large quantity of salt and reduces the stability of the latex, as a result of which rubber masses tend to be formed. In addition, because these processes result in a broad particle size distribution and cause the formation of macroparticles when the resultant graft-copolymers as an impact resistance improving agent are added to, for example, vinyl chloride resins and the resulting composition is shaped, the shaped article is remarkably inferior in transparency and surface gloss to shaped articles not containing such improving agents.

SUMMARY OF THE INVENTION

In view of the above described problems we have carried out studies directed toward the development of a process for coagulating a rubber latex by using various electrolyte materials. As a result, we have found that the addition of an aqueous solution of a salt of a strong acid and a monovalent strong base, which solution has been adjusted to alkalinity, as a coagulating agent to a rubber latex polymerized with the use of a fatty acid soap, results in a latex containing rubber particles having a high degree of coagulation and a relatively narrow range of particle size distribution which is desirable as a base material for an impact resistance improving agent with almost no formation of rubber masses and macroparticles. This discovery forms a basis of this invention.

That is, the process for producing a graft-polymer according to the present invention is characterized by the addition of an aqueous solution of a salt of a strong acid and a monovalent strong base, which solution has been adjusted to a pH value of 8 to 13, to a rubber latex containing diene rubber particles and a fatty acid soap as an emulsifying agent to coagulate the above mentioned rubber particles and the addition thereafter of a vinyl monomer to the latex containing the coagulated rubber particles to graft-polymerize the mixture.

According to the present invention, an aqueous solution of a salt of a strong acid and a monovalent strong base, which solution has been adjusted to alkalinity, is added to a rubber latex. According to this invention, desirable coagulation of the latex particles is achieved without the formation of rubber masses and macroparticles or spreading of the particle size distribution. Since these undesirable occurrences were heretofore considered to be unavoidable accompaniments of coagulation, the effectiveness of this invention is believed unexpectedly remarkable. Furthermore, there is little contamination by impurities in the process of this invention because an emulsifying agent other than a fatty acid soap need not be used in combination and the salt used in the coagulation can also be easily washed out. In this way, a rubber latex having a suitable particle size distribution as a base material for a blending graft-copolymer can be advantageously produced on an industrial scale. This rubber latex can be used as a base material to produce a blending graft-copolymer which has a great effect in providing impact resistance and is capable of exhibiting an excellent appearance such as transparency and surface gloss.

DETAILED DESCRIPTION OF THE INVENTION

A diene rubber latex which may be suitably used in the present invention is one which is produced in the presence of a fatty acid soap as an emulsifying agent by a conventional radical polymerization and has a solid content of 20 to 50% by weight, a pH of 8 to 10 and a particle size such that at least 90% by weight of the polymer particles is in the range of 0.05 to 0.15μ. The diene rubber may be a polymer comprised of butadiene alone or a copolymer comprised of at least 50% by weight of butadiene and a monomer copolymerizable with butadiene, such as styrene, acrylonitrile and methyl methacrylate.

In the present invention, a fatty acid soap is used as an emulsifying agent in order to produce a diene rubber latex having a desirable particle size and giving a final product of a good mechanical stability. Other emulsifying agents such as sulfonic acid salts represented by alkylsulfonic acid salts and alkylsulfosuccinic acid salts, do not give as good coagulation results as a fatty acid soap does when used in combination with the coagulating agent of the invention described hereinafter. A fatty acid soap is also desirable because when the resulting graft copolymer is blended with polyvinyl chloride, the thermal stability of the polyvinyl chloride composition thus obtained is not deteriorated by the fatty acid even if it remains in the graft copolymer.

Examples of the fatty acid soap usable in the present invention are sodium salts and potassium salts of fatty acids such as oleic acid, palmitic acid, stearic acid, myristic acid, linoleic acid, and lauric acid. These fatty acid soaps as the emulsifying agent may be used singly or in combination. The fatty acid soap is ordinarily contained in the rubber latex in a quantity of 0.05 to 3% by weight.

An aqueous solution of a salt resulting from a strong acid and a monovalent strong base which has been adjusted to alkalinity, that is, the coagulating agent of the invention, is added to the above mentioned diene rubber latex to cause the coagulation of the rubber latex. A salt usable for the present invention may be any salt obtained by a combination of a cation such as $Na^+$ or $K^+$ and an anion such as $Cl^-$, $SO_4^{--}$ or $NO_3^-$. Examples of such salts are sodium chloride (NaCl), potassium chloride (KCl), sodium sulfate ($Na_2SO_4$), potassium sulfate ($K_2SO_4$), sodium nitrate ($NaNO_3$), potassium nitrate ($KNO_3$), and mixtures thereof.

It is necessary to adjust the pH of the aqueous solution of these salts to a value of 8.0 to 13.0, preferably 9.5 to 11.5 by adding an alkali to the solution. A pH value below 8.0 causes the formation of rubber masses during the coagulation of the latex particles. On the other hand, a pH value greater than 13.0 causes the same unfavourable phenomenon. Examples of alkalis suitable for the present invention are potassium hydroxide (KOH) and sodium hydroxide (NaOH).

An aqueous solution of these salts which has been adjusted to a pH value of 8.0 to 13.0 permits a diene rubber latex having a high degree of coagulation to be easily obtained without the formation of macroparticles and further rubber masses.

In addition to the neutral salts resulting from strong acids and monovalent strong bases which are used in the present invention, a salt of a strong acid and a di- or poly-valent strong base such as calcium chloride and magnesium chloride and a salt of a weak acid and a strong base such as sodium carbonate and sodium pyrophosphate may also be considered as a salt for the coagulating agent.

When an aqueous solution of these salts is used as a coagulating agent, it is true that a rubber latex having a high degree of coagulation is obtained. However, in this case, macroparticles and rubber masses tend to be formed together with the progress of the coagulation. In addition, if these salts remain in the resultant impact resistance improving agents, the thermal stability, transparency and processability of the final product may be impaired, and, thus, these salts are unfavourable.

In order to obtain the desired coagulated rubber latex, the concentration and quantity of the coagulating agent salt to be added to a rubber latex should be varied in accordance with the characteristics of the rubber latex such as the quantity of the fatty acid soap, the resin concentration, and the particle size of the latex particle. An aqueous solution having a concentration of 0.5 to 10% by weight is used in a quantity of 0.5 to 5 parts by weight (as salt) with respect to 100 parts by weight of the rubber solid content. After the addition of the coagulating agent, it is desirable to stir the resultant latex as uniformly as possible.

Then, a monomer is added to the coagulated rubber latex thus obtained to cause graft-polymerization. A monomer usable in the present invention may be any monomer such as alkyl methacrylates, aromatic vinyl monomers, acrylonitrile and alkyl acrylates. When the graft-copolymer thus obtained is blended with vinyl chloride resins (including, in addition to the homopolymer of vinyl chloride, copolymers of at least 70% by weight of vinyl chloride and a monomer copolymerizable therewith such as vinylidene chloride, vinyl acetate or acrylonitrile), styrene-methyl methacrylate copolymer resins, or styrene-acrylonitrile copolymer resins, it is preferable that the monomer be selected from the group consisting of styrene, methyl methacrylate, and acrylonitrile. Ordinarily, the grafting monomer is added to the latex in a quantity of 20 to 200 parts by weight with respect to 100 parts by weight of the diene rubber and the graft-polymerization is effected.

The graft-polymerization may also be carried out in two or more stages. For example, in the first stage, 50 to 90% by weight of a mixed monomer of styrene and methyl methacrylate which consists mainly of styrene (the term "consists mainly of" as used herein signifies that the component in question comprises at least 50% by weight, preferably 55% by weight or more of the mixture) is grafted onto the diene rubber. Then, in the second stage, 50 to 10% by weight of methyl methacrylate alone or a mixed monomer of methyl methacrylate and styrene which consists mainly of methyl methacrylate is grafted onto the resultant diene rubber.

The graft-copolymer obtained by such two stage polymerization is particularly suitable for improving the impact resistance of vinyl chloride resins when the copolymer is blended into the resins. In the graft-polymerization, a cross linking agent may be incorporated into the monomer, if desired. Examples of suitable cross linking agents are mono-, di-, tri- or tetraethyleneglycol dimethacrylate, 1,3-butylene glycol dimethacrylate and divinylbenzene. The cross linking agent is used in a quantity of 0.1 to 5 parts by weight with respect to 100 parts by weight of the monomer. Generally, it is preferable that the graft-copolymer of the present invention be used in a quantity of 1 to 50 parts by weight with respect to 100 parts by weight of the thermoplastic resin whose impact resistance is to be improved.

The above described description has been mainly directed to a process for producing a graft-copolymer which is particularly suitable for blending with vinyl chloride resins, styrene-methyl methacrylate copolymer resins or styrene-acrylonitrile copolymer resins. However, in the process of the present invention, it is also possible to obtain a graft-copolymer suitable for modifying other thermoplastic resins by using a grafting monomer compatible with the thermoplastic resin whose impact resistance is to be improved by blending therewith.

The present invention will be illustrated by the following examples and comparative examples. All quantities expressed in parts and percentages are by weight.

EXAMPLE 1

The following components were charged into an autoclave equipped with a stirrer, and the components were reacted together at a temperature of 60° C. for 13 hours to complete the polymerization.

| | |
|---|---|
| butadiene | 52 parts |
| styrene | 15.5 parts |
| divinylbenzene | 1.01 parts |
| diisopropylbenzene hydroperoxide | 0.061 part |
| ferrous sulfate ($FeSO_4 \cdot 7H_2O$) | 0.002 part |
| di-sodium salt of ethylene-diaminetetraacetic acid | 0.0034 part |
| formaldehyde sodium sulfoxylate | 0.0243 part |
| potassium oleate | 0.78 part |
| sodium pyrophosphate | 0.113 part |
| distilled water | 156 parts |

A rubber latex having a solid content of about 30%, a pH value of 9.0 and an apparent transparency was obtained in a polymerization yield of almost 100%. The rubber particles in the rubber latex had a number average particle size of $0.095\mu$. (Hereinafter, "particle size" means number average particle size).

40 parts of an aqueous solution of 5% NaCl the pH of which was adjusted to 11.7 by the addition of an aqueous solution of 1% NaOH thereto was added to the latex with stirring in order to coagulate and enlarge the rubber latex. After the addition of the coagulating agent was completed, stirring was continued for a further period of 30 minutes to complete the coagulating operation.

By this coagulating operation, a coagulated and enlarged rubber latex having an average particle size of $0.137\mu$, an index of particle size distribution of 1.22 (ratio of weight average particle size to number average particle size), and a maximum particle size of a coagulated particle of $0.33\mu$ was obtained. This latex was filtered on a gauze and rubber masses produced during the coagulating operation were examined and found to be of a quantity of 0.15% with respect to the total weight of the rubber.

1.25 parts of potassium oleate was added to the latex, and thereafter, the following first graft-polymerization components were added thereto to carry out the polymerization of the mixture at a temperature of 60° C. for 4 hours.

| First Graft-Polymerization Components | |
|---|---|
| styrene | 16.5 parts |
| methyl methacrylate | 8.5 parts |
| divinylbenzene | 0.25 part |
| diisopropylbenzene hydroperoxide | 0.0374 part |
| formaldehyde sodium sulfoxylate | 0.0374 part |

In addition, an aqueous solution of 1% NaOH was added to the latex to adjust the pH thereof to 10.5.

Thereafter, second graft-polymerization components as set forth below were added thereto to polymerize the mixture at a temperature of 60° C. for 5 hours while maintaining the pH thereof at a value of no less than 8.5.

| Second Graft-Polymerization Components | |
|---|---|
| methyl methacrylate | 7.5 parts |
| divinylbenzene | 0.075 part |
| diisopropylbenzene hydroperoxide | 0.0075 part |
| formaldehyde sodium sulfoxylate | 0.0075 part |

The rubber particles in the resultant latex had an average particle size of $0.156\mu$, an index of particle size distribution of 1.24, and a maximum particle size of $0.34\mu$. These values indicate that there was almost no progress in coagulation in the course of the graft-polymerization.

When the resultant latex was subjected to precipitation with acid, dehydration, and drying, a white powdery MBS resin was obtained. 12.5 parts of the MBS resin was blended with 87.5 parts of a vinyl chloride resin (of a degree of polymerization of 700) containing 2 parts of a tin stabilizer and 1 part of a lubricant, and the resulting mixture was kneaded with rolls at a temperature of 160° C. for 3 minutes. Thereafter, the kneaded mixture was pressed at a temperature of 195° C. for 7 minutes and 5 minutes, respectively, to prepare shaped plates having a thickness of 6 mm and 3 mm, respectively. The 6-mm plate had a V-notch Izod impact strength of 90 kg.cm/$cm^2$ and the 3-mm plate had a parallel light transmission of 84% and a cloud value of 4% as measured according to JIS K-6714. A T-die sheet of 0.1-mm thickness made from the same mixed resin had a surface gloss of 148% for G 60(%) as measured according to JIS Z-8741.

EXAMPLES 2 AND 3

The rubber latex obtained as described in Example 1 was coagulated with an aqueous solution of 5% NaCl which had been adjusted to a pH value of 11.7 in a quantity of 35 parts and 30 parts, respectively, as a coagulating agent. After the coagulation, the same two-stage graft-polymerization described in Example 1 was carried out to obtain MBS resins. The conditions of these latices and the properties of the MBS resins are set forth in Table 1.

COMPARATIVE EXAMPLES 1 THROUGH 3

The procedure as described in Example 1 was carried out except that: in Comparative Example 1, the rubber latex was used without being coagulated; in Comparative Example 2, 40 parts of an aqueous solution of 5% NaCl (of a pH of 6.5) was used as it was as a coagulating agent; and in Comparative Example 3, 30 parts of an aqueous solution of 0.2% HCl was used as a coagulating agent (Before the addition of the coagulating agent, 0.065 part of sodium dioctylsulfosuccinate was added in this case to stabilize the rubber latex. Also, after the addition of the coagulating agent, the pH of the latex was returned to 10.5 by using an aqueous solution of 1% NaOH). The conditions of the latices of these examples and the properties of the MBS resins prepared from these latices are shown in Table 1.

It is apparent from Comparative Example 1 that the MBS resin obtained without the coagulation of the rubber latex has only a small effect in imparting impact resistance.

As compared with Examples 1 through 3, Comparative Examples 2 and 3 produced a much greater quantity of rubber masses during the coagulation of the rubber latex and resulted in the formation of coagulated particles which had a wide particle size distribution and were coagulated and enlarged to a remarkable extent. Although the MBS resins prepared from these coagulated rubber latices as a base material (Comparative Examples 2 and 3) had the same impact resistance imparting effect as those of Examples, the appearance with respect to features such as transparency and surface gloss was inferior.

On the other hand, Examples 1 through 3 comprised coagulating the rubber latex with the use of an aqueous solution of a salt of a strong acid and a monovalent strong base which solution had been adjusted to alkalinity according to the present invention. In these Examples, little formation of rubber masses and macroparticles occurred and a coagulated rubber latex having a high degree of coagulation and a relatively narrow range of particle size distribution was obtained. The MBS resin which was obtained by using the above described coagulated rubber latex as the base material was found to be an impact resistance improving agent for vinyl chloride resins having a good balance in maintaining excellent features of appearance such as transparency and gloss while exhibiting excellent impact resistance.

having a pH of 8.0–10.0 and said diene rubber therein comprising at least 50% butadiene, and a fatty acid soap as an emulsifying agent to coagulate the rubber particles and thereafter adding a vinyl monomer selected from the group consisting of alkyl methacrylates, aromatic vinyl monomers, acrylonitrile, and alkyl acrylates to the latex containing the coagulated rubber particles to graft-polymerize the vinyl monomer.

2. A process for preparing a thermoplastic resin composition as claimed in claim 1, wherein the salt of a strong acid and a monovalent strong base is selected from the group consisting of sodium chloride, potassium chloride, sodium sulfate, potassium sulfate, sodium nitrate, and potassium nitrate.

3. A process for preparing a thermoplastic resin composition as claimed in claim 1, wherein the aqueous solution of said salt is added after the pH thereof has been adjusted to a value of 9.5 to 11.5.

4. A process for preparing a thermoplastic resin composition as claimed in claim 1, wherein the concentration of said salt in the aqueous solution of said salt is in the range of 0.5 to 10% by weight and said salt is added in a quantity of 0.5 to 5 parts by weight with respect to 100 parts by weight of the rubber solid content of the rubber latex.

5. A process for preparing a thermoplastic resin com-

TABLE 1

|  |  | Example 1 | Example 2 | Example 3 | Comparative Example 1 | Comparative Example 2 | Comparative Example 3 |
|---|---|---|---|---|---|---|---|
| Coagulating agent | Type | NaCl | NaCl | NaCl |  | NaCl | HCl |
|  | Concentration (%) | 5 | 5 | 5 |  | 5 | 0.2 |
|  | Quantity (part) | 40 | 35 | 30 |  | 40 | 30 |
|  | pH | 11.7 | 11.7 | 11.7 |  | 6.5 | — |
| Condition of latex particle | - Before coagulation - |  |  |  |  |  |  |
|  | Average particle size (μ) | 0.095 | 0.095 | 0.095 | 0.095 | 0.095 | 0.095 |
|  | Index of particle size distribution | 1.03 | 1.03 | 1.03 | 1.03 | 1.03 | 1.03 |
|  | - After coagulation - |  |  |  |  |  |  |
|  | Average particle size (μ) | 0.137 | 0.135 | 0.130 | 0.09 | 0.135 | 0.138 |
|  | Maximum particle size of coagulated particle (μ) | 0.330 | 0.330 | 0.320 | 0.150 | 0.450 | 0.470 |
|  | Index of particle size distribution | 1.22 | 1.20 | 1.18 | 1.05 | 1.40 | 1.57 |
|  | Quantity of rubber mass formed (Percentage with respect to the total weight of rubber) | 0.15 | 0.13 | 0.10 | 0 | 0.80 | 0.30 |
|  | - After graft polymerization - |  |  |  |  |  |  |
|  | Average particle size (μ) | 0.156 | 0.154 | 0.148 | 0.103 |  |  |
|  | Maximum particle size (μ) | 0.340 | 0.340 | 0.335 | 0.165 |  |  |
|  | Index of particle size distribution | 1.24 | 1.22 | 1.20 | 1.10 |  |  |
| Properties of MBS resin | Izod impact value (kg · cm/cm)*[1] | 90 | 88 | 85 | 30 | 90 | 92 |
|  | Parallel light transmission (%)*[2] | 84 | 84 | 84 | 85 | 82 | 82 |
|  | Cloud value (%) | 4 | 4 | 4 | 3 | 6 | 6 |
|  | Surface gloss of T-die sheet*[3] G60(%) | 148 | 148 | 149 | 150 | 146 | 142 |

*[1] A vinyl chloride resin composition comprising 87.5 parts of a vinyl chloride resin having a degree of polymerization of 700, 12.5 parts of an MBS resin, 2 parts of a tin type stabilizer, and 1 part of a lubricant was kneaded with rolls at a temperature of 160° C. for 3 minutes, and the kneaded mixture was pressed at a temperature of 195° C. for 7 minutes to form a shaped sheet of a thickness of 6 mm, which was subjected to the measurement according to JIS K-7110.
*[2] The above mentioned roll-kneaded sheet was pressed at a temperature of 195° C. for 5 minutes to form a shaped sheet of 3-mm thickness, which was subjected to the measurement according to JIS K-6714.
*[3] A T-die sheet of 0.1-mm thickness which was prepared from the same vinyl chloride resin composition described in *[1] was subjected to the measurement according to JIS Z-8741.

What is claimed is:

1. A process for preparing a thermoplastic resin composition having an improved impact resistance which comprises blending 100 parts by weight of a thermoplastic resin selected from the group consisting of vinyl chloride resins, styrene-methyl methcrylate copolymer resins and styrene-acrylonitrile resins and 1 to 50 parts by weight of a graft-copolymer obtained by a process which comprises adding an aqueous solution of a salt of a strong acid and a monovalent strong base, which solution has been adjusted to a pH value of 8 to 13, to a rubber latex containing diene rubber particles, said latex position as claimed in claim 1, wherein the rubber latex has a solid content of 20 to 50% by weight, and at least 90% by weight of the rubber particles has a particle size in the range of 0.05 to 0.15μ.

6. A process for preparing a thermoplastic resin composition as claimed in claim 1, wherein the vinyl monomer to be graft-polymerized is selected from the group consisting of styrene, methyl methacrylate, acrylonitrile and mixtures thereof.

7. A processing for preparing a thermoplastic resin composition as claimed in claim 1, wherein the vinyl monomer is graft-polymerized in a quantity of 20 to 200 parts by weight with respect to 100 parts by weight of the diene rubber.

8. A process for preparing a thermoplastic resin composition as claimed in claim 1, wherein the graft-polymerization is carried out in two stages, namely, a first stage in which a mixed monomer comprising styrene as a main component and methyl methacrylate is graft-polymerized in a quantity of 50 to 90% by weight of the total grafting vinyl monomer and a second stage in which methyl methacrylate alone or a mixed monomer comprising methyl methacrylate as a main component and styrene is graft-polymerized in a quantity comprising the remainder of the total grafting vinyl monomer.

9. A processing for preparing a thermoplastic resin composition as claimed in claim 1, wherein a cross-linking agent in a quantity of 0.1 to 5 parts by weight with respect to 100 parts by weight of the grafting vinyl monomer is used together with the monomer.

* * * * *